US010949109B2

(12) United States Patent
Roy et al.

(10) Patent No.: US 10,949,109 B2
(45) Date of Patent: Mar. 16, 2021

(54) EXPANSION CARTRIDGE FOR DEDUPLICATION OF DATA CHUNKS IN CLIENT DEVICES INTERSPERSED IN NETWORKED ENVIRONMENTS

(71) Applicant: ARC Document Solutions, LLC, San Ramon, CA (US)

(72) Inventors: Rahul Roy, Fremont, CA (US); Srinivasa Rao Mukkamala, Fremont, CA (US); Himadri Majumder, Nadia (IN); Dipali Bhattacharya, Kolkata (IN)

(73) Assignee: ARC Document Solutions, LLC, San Ramon, CA (US)

( * ) Notice: Subject to any disclaimer, the term of this patent is extended or adjusted under 35 U.S.C. 154(b) by 191 days.

(21) Appl. No.: 16/012,561

(22) Filed: Jun. 19, 2018

(65) Prior Publication Data

US 2018/0373455 A1    Dec. 27, 2018

(30) Foreign Application Priority Data

Jun. 22, 2017 (IN) .............................. 201711022010

(51) Int. Cl.
*G06F 3/06* (2006.01)
*G06F 13/16* (2006.01)

(52) U.S. Cl.
CPC ............ *G06F 3/0641* (2013.01); *G06F 3/065* (2013.01); *G06F 3/067* (2013.01); *G06F 3/0608* (2013.01); *G06F 3/0673* (2013.01); *G06F 13/1668* (2013.01); *G06F 2213/0032* (2013.01); *G06F 2213/0036* (2013.01)

(58) Field of Classification Search
CPC ...... G06F 3/0608; G06F 3/0641; G06F 3/065; G06F 3/067; G06F 3/0673; G06F 13/1668; G06F 2213/0032; G06F 2213/0036
See application file for complete search history.

(56) References Cited

U.S. PATENT DOCUMENTS

2010/0250858 A1* 9/2010 Cremelie ............ G06F 11/1453
711/136
2015/0331775 A1* 11/2015 Slik ....................... G06F 11/008
714/6.23

* cited by examiner

*Primary Examiner* — Larry T MacKall
(74) *Attorney, Agent, or Firm* — Kilpatrick Townsend & Stockton LLP (57) ABSTRACT

An expansion cartridge (200) and a method for deduplicating the data chunks stored at a client device (100) using the expansion cartridge (200), (300) are claimed herein. As per the invention, the expansion cartridge (200) is attachable, externally, to client devices (100) carrying the electronic data files to be transferred, wherein the expansion cartridge (200) is characterized by a file management component (220), a chunk management component (240), a storage component (260), and a mirroring component (280), and wherein, the expansion cartridge (200) on being attached with the client devices (100) interfaces with a client side data historian (125) and a client side processor (150) in the client device (100) using interfacing options, including without limitation, Small Computer System Interfaces (SCSI), Fibre Channel (FC) Interface, Ethernet Interface, Advanced Technology Attachment (ATA) Interface or a combination thereof.

10 Claims, 4 Drawing Sheets

EXPANSION CARTRIDGE FOR DEDUPLICATION OF DATA CHUNKS IN CLIENT DEVICES INTERSPERSED IN NETWORKED ENVIRONMENTS

CROSS-REFERENCES TO RELATED APPLICATIONS

This application claims the benefit of Indian Application No. 201711022010, filed Jun. 22, 2017, which is hereby incorporated by reference in its entirety for all purposes.

FIELD OF THE INVENTION

This invention pertains to the field of data deduplication, and more particularly, to the field of deduplication of data chunks in client devices interspersed in a networked environment.

BACKGROUND OF THE INVENTION

The proliferation of intranets, extranets and the internet has made way for efficient networked environments based on Information & Communication Technology which allow authorized persons and/or entities to work towards the development, completion and execution of projects, irrespective of their geographical locations. In these networked environments, usually, the projects to be executed are broken down into smaller aspects which are then co-dependently and co-ordinatively, executed by the persons and/or the entities authorized thereof. Thus in this context, person skilled in the art would appreciate that prompt and timely sharing of data/information relevant to the project sought to be developed, completed and executed (henceforth called "electronic data file") between the authorized persons and/or the entities becomes indispensable, because not doing so leads to failure of co-ordination between the authorized persons and/or the entities, which in turn, leads to complete or partial failure of the project itself.

The prompt and timely transferring of the electronic data files is achieved by creating, at the client device bearing the electronic data file to be transferred, data chunks corresponding to the electronic data file to be transferred, and transmitting the data chunks to those other client device(s) in the networked environment wherefrom a request to receive the electronic data file to be transferred, is made. Person skilled in the art would appreciate that creation and transmission of data chunks is preferred over transmission of the electronic data file in its entirety, because the later suffers from various problems that the former successfully overcomes. The transferring of the electronic data file in its entirety may suffer from problems such as lags in transfer, degradation of quality of content, and distortion of content, and in certain exceptional cases, may also fall victim to complete failure to transfer. Such exceptional cases may arise when the client devices requesting to receive the electronic data files to be transferred have a cap on the size of the electronic data files that they would be able to receive in one instance of transfer, and the electronic data file to be transferred therein exceed that size cap. For instance, client devices with FAT 32 file systems have a size cap of 4 GB and therefore any electronic data file whose size is in excess of 4 GB, would not get transferred at such client devices having FAT 32 file systems, in a single instance of transfer.

The creation and transferring of data chunks, despite being the preferred way of transferring electronic data files, may suffer from the problem of duplicate and/or redundant generation of data chunks which when stored at the client devices where they are generated, may unnecessarily consume storage space therein. For instance, if a request to receive an electronic data file "ABC.txt" from a client device C1 is made by client devices C2 and C4, all of which are interspersed in the networked environment, then under normal circumstances, two sets of identical data chunks of "ABC.txt" would be created at the client device C1, which when stored therein would unnecessarily consume the storage system. Person skilled in the art would understand that it would be more space efficient to store one set of data chunks of the electronic data file "ABC.txt" in the client device C1 and create their copies whenever a request for the electronic data file to be transferred is received, instead of storing two sets of data chunks of the file "ABC.txt" for client devices C2 and C4, each.

This invention, therefore, is directed to address the aforesaid problem and offer a solution that easily and efficiently, deduplicates and/or eliminates the redundancy of the data chunks at the client devices where they are generated.

SUMMARY OF THE INVENTION

The present invention is intended to address at least the above mentioned problems and/or disadvantages and to provide a suitable solution. Accordingly, an aspect of the present invention is to provide an expansion cartridge attachable, externally, to client devices for deduplicating the data chunks of the electronic data files to be transferred, stored therein, and a method using the expansion cartridge attachable, externally, with the client device for deduplicating the data chunks of the electronic data files to be transferred, stored therein.

An aspect of the present invention, therefore, is an expansion cartridge attachable, externally, to client devices carrying electronic data files to be transferred, wherein the expansion cartridge is characterized by a file management component, a chunk management component, a storage component, and a mirroring component, wherein the expansion cartridge on being attached with the client devices interfaces with a client side data historian and a client side processor in the client device.

Yet another aspect of the present invention, therefore, is a method for deduplicating, at the client device, the data chunks of the electronic data files to be transferred, using the expansion cartridge wherein the method comprises the steps of determining a Unique Identification String for the electronic data file to be transferred, generating a preliminary set of metadata for the electronic data file to be transferred, dividing the electronic data file to be transferred for generating data chunks, generating a final set of metadata for each data chunk generated thereof, and comparing the data chunks with the final sets of metadata generated thereof with the data chunks with final sets of metadata already stored at the one or more discrete tuples in the client side data historian, and, discarding or storing the data chunks with the final sets of metadata generated thereof, based on the comparing thereof.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the detailed description that follows taken in conjunction with the accompanying drawings, wherein.

DETAILED DESCRIPTION OF THE INVENTION

Advantages and features of the present invention and methods of accomplishing the same may be understood more readily by referring to this detailed description of preferred embodiments and the accompanying drawings. The present invention may, however, be embodied in many different forms and should not be construed as being limited to the embodiments set forth herein. Rather, these embodiments should be considered for thorough and complete disclosure of the invention and for fully conveying the concept of the invention to those skilled in the art. For the sake of simplicity various aspects of the preferred system and method embodiments are referred using numerals which refer to the same aspects throughout the specification.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising", when used in this specification, specify the presence of stated features, integers, steps, operations, elements, and/or components, but do not preclude the presence or addition of other features, integers, steps, operations, elements, and/or components.

Various techniques and mechanisms of the present invention will sometimes be described in singular form for clarity. Such singular descriptions of techniques and mechanisms may however include multiple iterations of that technique and/or multiple instantiations of that mechanism, respectively, unless the context suggests otherwise. Furthermore, various techniques and mechanisms of the present invention will sometimes describe a connection between two entities. It should be noted that the connection between two entities does not necessarily mean a direct, unimpeded connection, as a variety of other entities may reside between the two entities. Further the connection between any two entities disclosed in the invention should not only be construed as being dedicated hard wired connections, but should also include virtual and/or wireless connections.

It will be understood that, although the terms first, second, third etc., may be used herein to describe some elements, components, regions, layers and/or sections, these elements, components, regions, layers and/or sections should not be limited by these terms. Thus, a first element, component, region, layer and/or section disclosed in the description could be termed as a second element, component, region, layer and/or section, or vice versa, without departing from the teachings of the present invention.

Unless otherwise defined, the terms (including technical and scientific terms) used herein shall have the same meaning as commonly understood by one of ordinary skill in the art. Further, the terms defined in commonly used dictionaries should be interpreted and construed in a manner consistent with their dictionary meaning, and should not be interpreted in an idealized or overly formal sense unless expressly defined.

FIG. 1 to FIG. 4, discussed below are non limiting illustrations which have been used to explain and describe the invention disclosed herein. Persons skilled in the art will appreciate that the purpose of these figures is to provide clarity to the concepts associated with the various technical embodiments of the invention and not to limit the invention. These figures include without limitation, block diagrams, flowcharts, schematics and/or other simplistic representations that explain the various aspects of the invention with ease and effectiveness.

Figure 1:
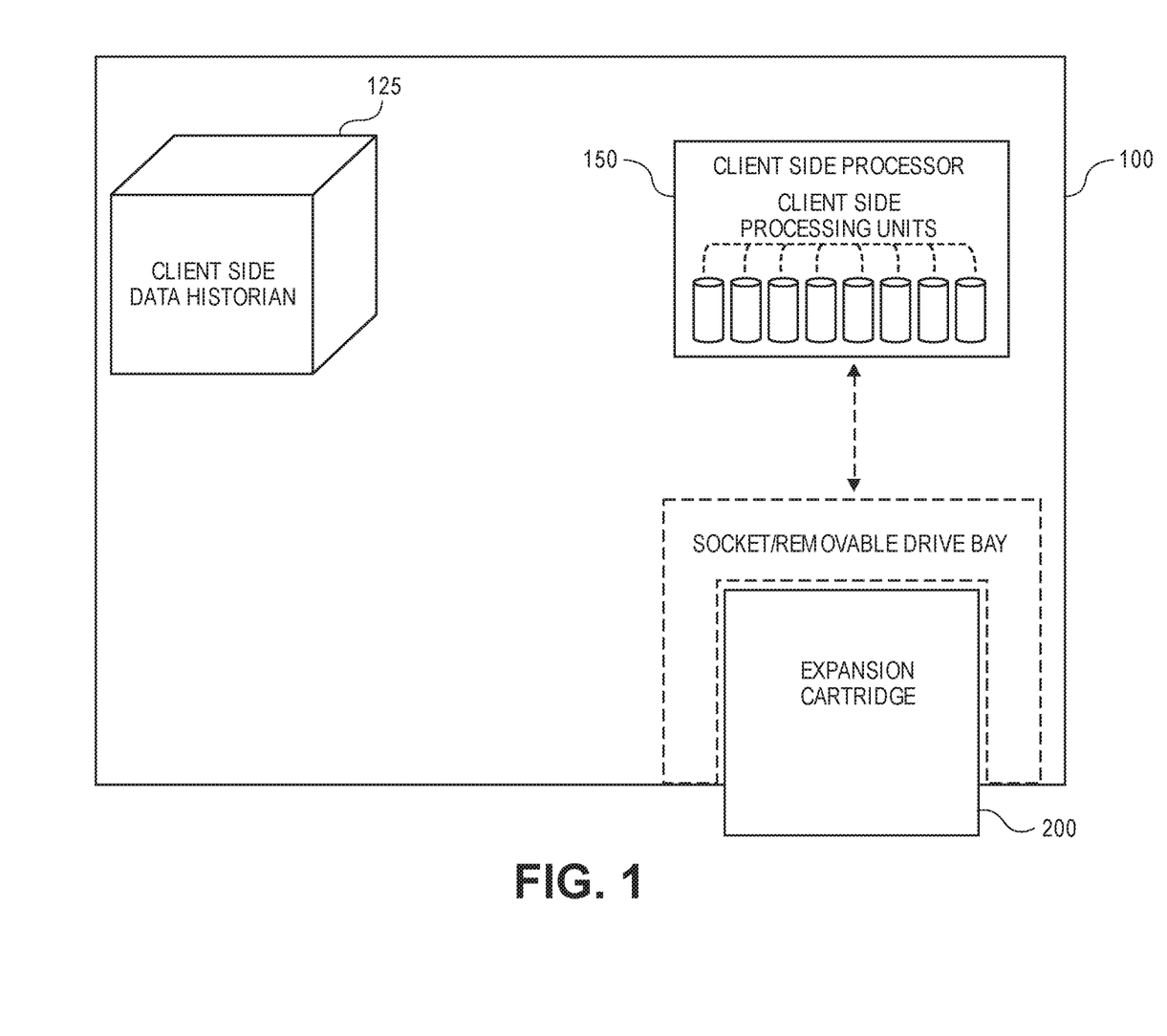
FIG. 1 illustrates a block diagram of a client device (100) interspersed in the networked environment.

Referring now to drawings, and first to FIG. 1, a block diagram of a client device (100) located in a networked environment, is designated by the numeral (100) which comprises a client side data historian (125) based on industrially accepted databases that store the electronic data files and/or their data chunks at discrete tuples which may access, operate, federate, combine, sync, and link with the other discrete tuples therein, and a client side processor (150) with specialized client side processing units including integrated system (bus) controllers, memory management control units, floating point units, graphics processing units, digital signal processing units, or a combination thereof. Further, in accordance with this invention, the client devices (100) are configured to embody, removably, an expansion cartridge (200) which, in different embodiments, may either be inserted directly in the client devices (100) or may be inserted over a removable drive bay mounted on the client devices (100). Upon insertion of the expansion cartridge (200) in the client device (100), the expansion cartridge (200) interfaces with the client side data historian (125) and the client side processor (150), using interfacing options such as Small Computer System Interface (SCSI), Fibre Channel (FC) interface, Ethernet interface, Advanced Technology Attachment (ATA) interface, or a combination thereof, on a per case basis.

Figure 2:
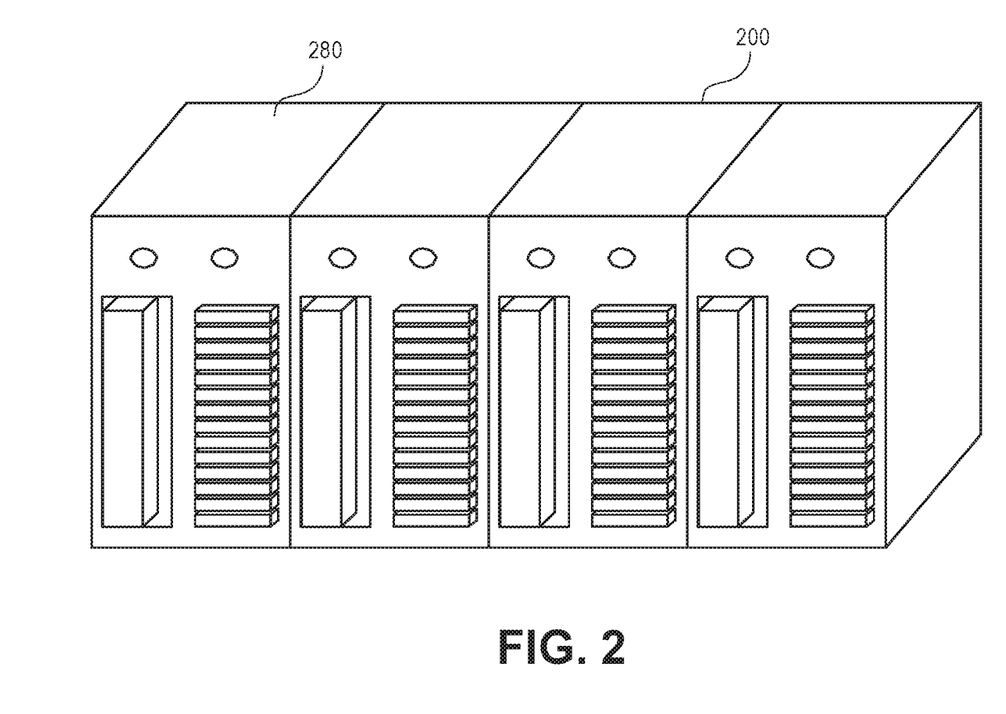
FIG. 2 illustrates an expansion cartridge (200) in accordance with the invention.

FIG. 2 is an exemplary illustration of the expansion cartridge (200) in accordance with the invention. As may be seen in the illustration, the expansion cartridge (200) is a specially-designed plug in hardware, which comprises male as well as female ports, slots, electrical contacts and arms, electrical connectors and all such elements useful for compatibly, connecting, the expansion cartridge (200) with the client devices (100). Person skilled in the art would appreciate that the expansion cartridge (200), being a multi-functional hardware device, would include inter alia a dedicated processing unit in conjunction with active components such as transistors, diodes/triodes, vacuum tubes (valves), and tunnel diodes, or passive components such resistors, capacitors, inductors and transformers, wherein, both, the active components and the passive components, may be packaged discretely or in arrays, or may be integrated inside of packages such as semiconductor integrated circuits, hybrid integrated circuits, or thick film devices.

In accordance with the invention, upon the insertion of the expansion cartridge (200) in the client device (100), the expansion cartridge (200), firstly, connects with the client side processor (150) therein, to obtain the electronic data file side, identified by the client side processor (150), for transferring. On obtaining the electronic data file to be transferred, the expansion cartridge (200) subjects the electronic data file to be transferred to its components for further processment, which in accordance with the invention include a file management component (220), a chunk management component (240), a storage component (260) and a mirroring component (280). The expansion cartridge (200), firstly, invokes the file management component (220) that acts upon the electronic data file and executes a two-fold operation. Firstly, the file management component (220) generates a Unique Identification String for the electronic data file to be transferred, using a non-repetitive string generation operation wherein the Unique Identification String generated thereof is consistent with a fixed pattern (e.g. six-character alphanumeric strings starting with "$" symbol). Next, the file management component (220) creates a preliminary set of metadata for the electronic data file with Unique Identification String. As per a preferred characterization, the preliminary set of metadata for a particular electronic data file with particular Unique Identification String comprises:

(1) "SRC", that is, the MAC/Network Address of the client device (100) where the particular electronic data file is present,
(2) "DSTN", that is, the MAC/Network Address of the client device (100) making the request to receive the particular electronic data file,
(3) "UID", that is, the Unique Identification String (UID) generated for the particular electronic data file,
(4) "FNAME", that is, the name of the particular electronic data file,
(5) "FSIZE", that is, the size of the particular electronic data file, and
(6) "FFORMAT", that is, the format of the particular electronic data file.

Accordingly, in an example, if the electronic data file "ABC.txt" of 4 MB stored at the client device (100) C having MAC/Network Address 00:A1:C7:18:F2:18, is requested by the client device (100) C4 having MAC/Network Address 00:A1:C7:16:F9:01, then the file management component (220) of C1 would firstly generate the Unique Identification String for "ABC.txt", say "$7H6DD5", and thereafter create the preliminary set of metadata for the electronic data file which would include—
  "SRC"=00:A1:C7:18:F2:18, "DSTN"=00:A1:C7:16:F9:01, "UID"=$7H6DD5,
  "FNAME"=ABC.txt, "FSIZE"=4 MB, and "FFORMAT"=.txt (text).

Once the preliminary set of metadata is generated for the electronic data file to be transferred, then all the operations at/in relation to the file management component (220) are deemed to be completed, and thereafter the electronic data file to be transferred and its preliminary set of metadata are moved to the chunk management component (240) which firstly divides the electronic data file to be transferred to generate data chunks using chunking parameters that include without limitation, the size/size range of the data chunks, and the chunking technique to be used, which in a preferred embodiment may be obtained from the registered users of the networked environment.

To understand the functioning of the chunk management component (240) in connection with the division of the electronic data file to be transferred to generate data chunks, consider an example where a 100 MB image file is received at the chunk management component (240) and the chunking parameters for the image file set the chunking technique for the image file to fixed-size chunking and the size of each data chunk to 1 MB then in such case, the chunk management component (240) would create 100 data chunks of 1 MB each. Likewise, in another example if a text file is received at the chunk management component (240) and the chunking parameters for the text file set the chunking technique to Basic sliding, then the chunk management component (240) would introduce condition logics in the text file that mark chunk boundaries therein, and then divide the text file at the said chunk boundaries to obtain the requisite data chunks. Similarly, in another example if an AV (audio-visual) file is received at the chunk management component (240) and the chunking parameters for the AV file set the chunk technique to TTTD (Two threshold two divisor) and the size range of the data chunks then the chunk management component (240) would generate data chunks within the said size range.

In accordance with the invention, while the chunk management component (240) performs the operation of dividing the electronic data file and generating data chunks, the chunk management component (240) also triggers numerous intrinsic sub-operations, the first one being, recording the number at which each data chunk is generated for the electronic data file to be transferred, and the total number of data chunks generated thereof, and, attributing them as the "CNO" and "TNO" of that data chunk, respectively. In accordance with the invention, the chunk management component (240) performs this sub-operation by initializing a counter variable at "0" and incrementing it by "1" every time a data chunk is generated for the electronic data file, such that the value of the counter variable after every increment is retained as the "CNO" of that data chunk, and the finally incremented value of the counter variable after the electronic data file to be transferred is divided completely, and all of its data chunks are generated thereof, is retained at the "TNO" of that data chunk. Thus, by the end of this sub-operation, the "CNO" and "TNO" values for all the data chunks generated from the electronic data file to be transferred are obtained, and the counter variable is reset to "0" so as to iteratively determine the values of "CNO" and "TNO" for the data chunks generated from the next electronic data file as well, in a similar fashion. As per an example of this sub-operation, if electronic data file "ABC.txt" of 3 MB is moved into the chunk management component (240) to be divided into three data chunks then when the first data chunk is generated, the value of the counter variable value is incremented from "0" to "1" and the "CNO" value, therefore, of the first data chunk is retained as "1". Similarly when the second data chunk is generated, the value of the counter variable value is incremented from "1" to "2" and the "CNO" value, therefore, of the second data chunk is retained as "2". Likewise, when the third data chunk is generated, the value of the counter variable value is incremented from "2" to "3" and the "CNO" value, therefore, of the third data chunk is retained as "3". Further, as per this sub-operation, once the data chunks are generated for the electronic data file "ABC.txt", the finally incremented value of the counter variable (3, in this case) is retained as the "TNO" value for all the three data chunks of the electronic data file "ABC.txt". Once this sub-operation is completed for the electronic data file "ABC.txt", the counter variable value is reset to "0" so that the values of "CNO" and "TNO" become calculable in a similar manner for the next electronic data file moved into the chunk management component (240).

A second intrinsic sub-operation that the chunk management component (240) triggers in concurrence with the first intrinsic sub-operation is that of recording the size of each data chunk generated for the electronic data file to be transferred, and attributing the size as the "CSIZE" of that data chunk. In a preferred embodiment, the chunk management component (240) achieves this for each data chunk by measuring the byte size between the end limits of each data chunk generated thereof.

A third intrinsic sub-operation that the chunk management component (240) triggers in concurrence with the first intrinsic sub-operation and the second intrinsic sub-operation is that of naming each data chunks generated thereof as per at least one nomenclature rule, and attributing that string as the "CNAME" of the data chunk named thereof. In a preferred embodiment, this sub-operation may name the data chunks generated from the electronic data file to be transferred as per the following naming formula—<FNAME_CNO.FFORMAT> wherein FNAME, CNO and FFORMAT, represent the name of the electronic data file, the number at which the data chunk for the electronic data file to be transferred is generated, and the format of the electronic data file to be transferred, respectively. Accordingly, as per an example of this sub-operation, if three data chunk pertaining to the electronic data file "ABC.txt" are subjected to this sub-operation then the first data chunk which is generated would called "ABC_1.txt", the second data chunk which is generated would be called "ABC_2.txt", and the third data chunk which is generated would be called "ABC_3.txt", all of which would be saved as their respective "CNAME" values.

Once the chunk management component (240) divides the electronic data file to be transferred and generates the data chunks therefrom, in conjunction with the first intrinsic sub-operation, the second intrinsic sub-operation, and the third intrinsic sub-operation, the chunk management component (240), generates a final set of metadata for each data chunk generated thereof, by integrating the preliminary set of metadata of the electronic data file to be transferred, generated at the file management component (220), with the "CNO", "TNO", "CSIZE" and "CNAME" obtained per chunk, pursuant to the first, second and third intrinsic operations, at the chunk management component (240).

Figure 3:
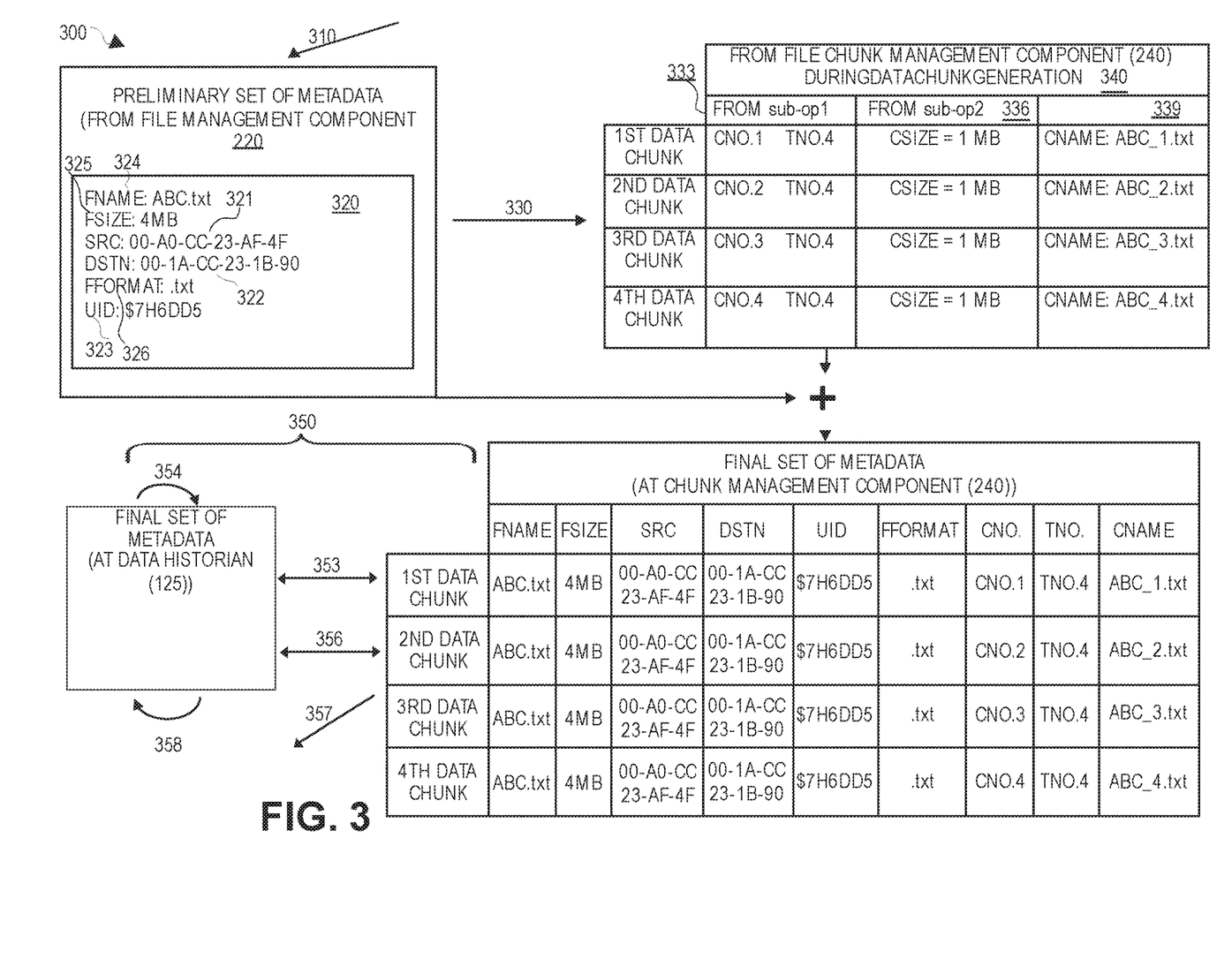
FIG. 3 illustrates a table containing the final sets of metadata generated for sample data chunks pertaining to an electronic data file to be transferred.

FIG. 3 illustrates a table of the final set of metadata generated for the electronic data file "ABC.txt" of 4 MB at the chunk management component (240). In accordance with the illustration this generation of the final set of metadata for "ABC.txt" is initiated by taking the preliminary set of metadata for the electronic data file "ABC.txt", generated at the file management component (220), viz.—
"SRC"=00:A1:C7:18:F2:18 (i.e. MAC address of the client device (100) where ABC.txt is present)
"DSTN"=00:A1:C7:16:F9:01, (i.e. MAC address of the client device (100), where ABC.txt is to be transferred)
"UID"=$7H6DD5, (i.e. the UID created for ABC.txt)
"FNAME"=ABC.txt. (i.e. the name of the ABC.txt file)
"FSIZE"=4 MB, (i.e. the file size of ABC.txt)
"FFORMAT"=.txt (text), (i.e. the file format of ABC.txt)
and, integrating the values of the "CNO", the "TNO", the "CSIZE" and the "CNAME" obtained for each data chunk at the chunk management component (240), pursuant to the first intrinsic sub-operation, the second intrinsic sub-operation, and the third intrinsic sub-operation described above. In accordance with the illustration, the values of the "CNO", the "CSIZE", the "TNO" and the "CNAME" details for each data chunks generated thereof is—
First Data chunk—"CNO"=1, "TNO"=4, "CSIZE"=1 MB and "CNAME"=ABC_1.txt
Second Data chunk—"CNO"=2, "TNO"=4, "CSIZE"=1 MBand "CNAME"=ABC 2.txt
Third Data chunk—"CNO"=3, "TNO"=4, "CSIZE"=1 MBand "CNAME"=ABC_3.txt,
Fourth Data chunk—"CNO"=4, "TNO"=4, "CSIZE"=1 MBand "CNAME"=ABC_4.txt
and therefore, the final set of metadata for each data chunk generated thereof shall be—
First Data Chunk—
"SRC"=00:A1:C7:18:F2:18, "DSTN"=00:A1:C7:16:F9:01, "UID"=$7H6DD5, "FNAME"=ABC.txt, "FSIZE"=4 MB, "FFORMAT"=.txt (text), "CNO"=1, "TNO"=4 and "CNAME"=ABC_1.txt.
Second Data Chunk—
"SRC"=00:A1:C7:18:F2:18, "DSTN"=00:A1:C7:16:F9:01, "UID"=$7H6DD5, "FNAME"=ABC.txt, "FSIZE"=4 MB, "FFORMAT"=.txt (text), "CNO"=2, "TNO"=4 and "CNAME"=ABC_2.txt.
Third Data Chunk—
"SRC"=00:A1:C7:18:F2:18, "DSTN"=00:A1:C7:16:F9:01, "UID"=$7H6DD5, "FNAME"=ABC.txt, "FSIZE"=4 MB, "FFORMAT"=.txt (text), "CNO"=3, "TNO"=4 and "CNAME"=ABC_3.txt, and
Fourth Data Chunk—
"SRC"=00:A1:C7:18:F2:18, "DSTN"=00:A1:C7:16:F9:01, "UID"=$7H6DD5, "FNAME"=ABC.txt, "FSIZE"=4 MB, "FFORMAT"=.txt (text), "CNO"=4. "TNO"=4 and "CNAME"=ABC_4.txt.

Once the data chunks with final sets of metadata are generated from the electronic data file to be transferred, at the chunk management component (240), all activities at/in relation to the chunk management component (240) are deemed to be completed, and the data chunks with final sets of metadata are forwarded to the storage component (260) which in the broadest sense communicably connects with the client side data historian (125) to selectively store, at discrete tuples therein, the data chunks with final sets of metadata.

Person skilled in the art would appreciate that in accordance with the invention, the purpose of having a client side data historian (125) that stores data/information at discrete tuples therein is to enable the storing of data chunks with final sets of metadata at contiguous cells within the same tuple. This way all the data chunks pertaining to a particular electronic data file would be stored within the same tuple. Person skilled in the art would further appreciate that in accordance with the invention, the tuples at the client side data historian (125) would be dynamic so that the cells therein could be increased or decreased to accommodate, exactly, the data chunks with the final sets of metadata for the particular electronic data file.

Thus in conspectus of the forgoing, the storage component (260) upon receiving the data chunks with the final sets of metadata from the chunk management component (240), firstly compares the data chunks with final sets of metadata received thereof against those data chunks already stored at the discrete tuples at the client side data historian (125) to confirm whether they are already present or not. In accordance with the invention, the storage component (260) performs the comparison in two rounds. In the first round, the storage component (260) reads the values of the "SRC", "DSTN" and "UID" metadata from the final set of metadata of any of the data chunks received thereof and matches them with the "SRC", "DSTN" and "UID" metadata from the final set of metadata of the data chunks already stored at the discrete tuples in the client side data historian (125) to determine whether or not there are any data chunks in the discrete tuples in the client side data historian (125) that pertain to the electronic data file to be transferred. If no match is found, then the storage component (260) deduces that the data chunks with the final sets of metadata have been received for the first time, and are therefore stored at an unoccupied discrete tuple therein. If however, a match is found, then the storage component (260), probes further by comparing the values of "TNO" and "CSIZE" of the data chunks with final sets of metadata received at the client side data historian (125) against the values of "TNO" and "CSIZE" of the data chunks which are present at that discrete tuple where the values of the "SRC", "DSTN" and "UID" metadata are found to be the same. If match is found between the values of "TNO" and the "CSIZE" of all data chunks with final sets of metadata compared thereof, then the storage component (260) deduces that they are the same, and discards the data chunks with final sets of metadata received at the client side data historian (125). If however, a match is not found between the values of "TNO" and the "CSIZE" of all data chunks with final sets of metadata compared thereof, then the storage component (260) deduces that they are different, and stores them at an unoccupied discrete tuple in the client side data historian (125).

Person skilled in the art would appreciate that while the matching of the values of "SRC", "DSTN" and "UID" in the final sets of metadata of the data chunks received thereof with the values of "SRC", "DSTN" and "UID" in the final sets of metadata of the data chunks at the discrete tuples in the client side data historian (125) is evidence enough to establish that the data chunks pertain to the same electronic data file have been found, merely pursuing this comparison to discard or store the data chunks with the final sets of metadata, may lead to inefficiency as sometimes the size and number of the data chunks pertaining to the electronic data file to be transferred may become pivotal in determining whether the client device (100) requesting receipt of the data chunks would be able to receive them or not.

Figure 4:
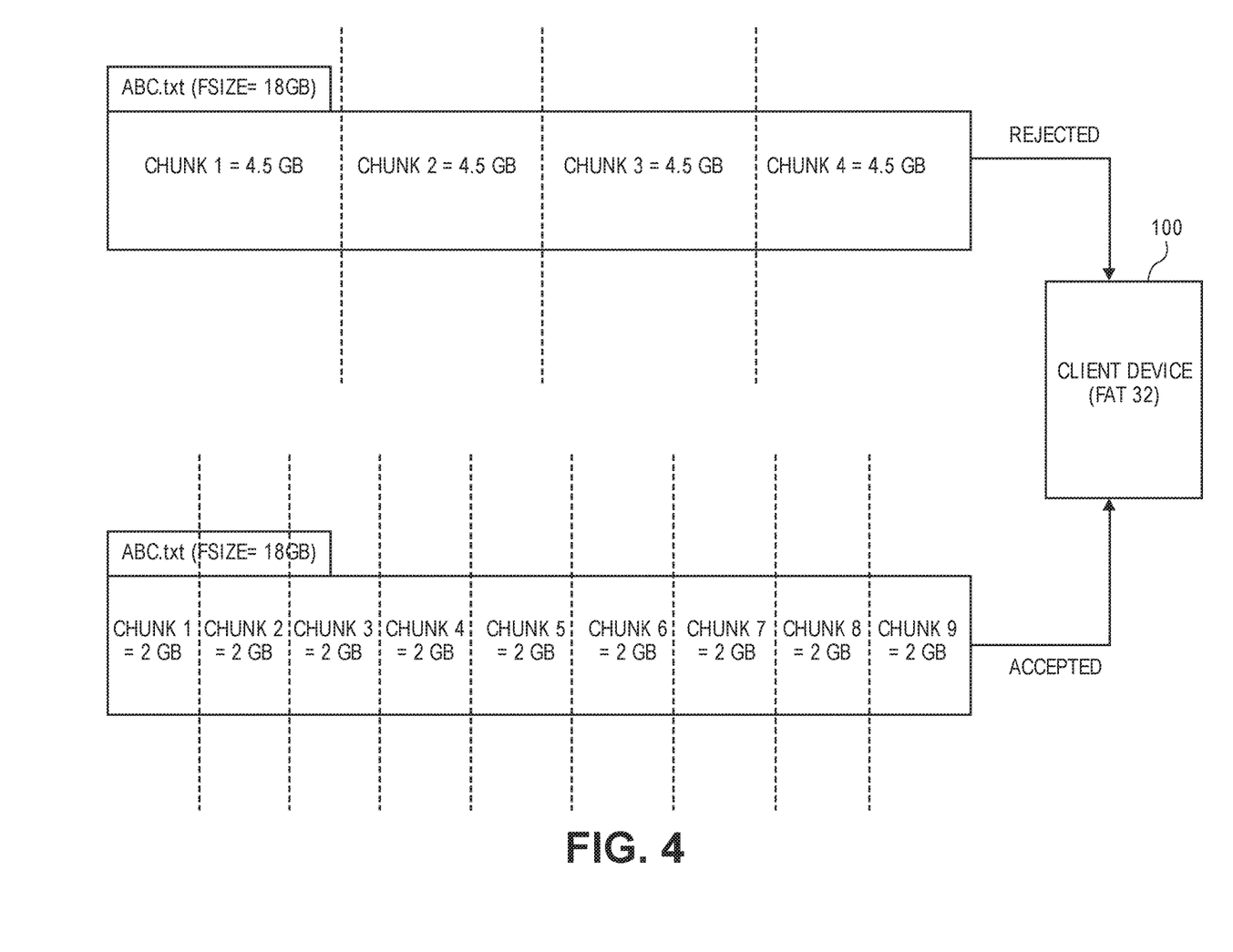
FIG. 4 illustrates the problem of selective, acceptance or rejection, of data chunks pertaining to an electronic data file to be transferred, at client device (100), depending of the size of the data chunks and the number of data chunks generated thereof.

FIG. 4 illustrates a typical case of the scenario explained above. As may be seen in the illustration when the electronic data file ABC.txt, 18 GB in size, is divided into four data chunks of 4.5 GB each then all the data chunks generate thereof may be rejected from entering a client device (100) having a FAT 32 file system, as this file system places a cap of 4 GB on the size of the data/information that the client device (100) may accept in one go. Likewise, when the same electronic data file ABC.txt, is divided into nine data chunks of 2 GB each, then all the data chunks generated thereof would be accepted at the same client device (100) as 2 GB is well within the size cap of 4 GB.

Thus as an outcome of the operation of comparison, and subsequent storing and/or discarding of the data chunks with final sets of metadata, the storage component (260) does away with the problem of duplicate and redundant storage of the data chunks at the discrete tuples at the client side data historian (125), thereby optimizing storage space thereat.

Once the storage component (260) completes its operations, the deduplication of the client side data historian (125) by the expansion cartridge (200) is deemed to have been successfully accomplished. However, it is not just an object of the invention to deduplicate the client side data historian (125) while storing the data chunks with final sets of metadata therein, but to also maintain the deduplicacy of the client side data historian (125) when the data chunks with final sets of metadata are requested therefrom by other client devices (100) in the networked environment. It may be the case that upon receiving the request for a particular electronic data file to be transferred, the data chunks with the final sets of metadata are removed and transferred from the client side data historian (125) to the other client devices (100) requesting thereof, in which case all the data chunks for the particular electronic data file would get lost from the client side data historian (125) for future use and reference. In accordance with the invention, this problem may be addressed by the mirroring component (280) that connects with the client side data historian (125), and determines the discrete tuple therein where the data chunks with the final sets of metadata requested thereof are stored, and thereafter, instead of transferring the data chunks with final sets of metadata stored therein, creates a copy of the data chunks with the final sets of metadata stored at the discrete tuple determined thereof which is then transmitted to the other client devices (100) in the networked environment wherefrom the request of the data chunks with final sets of metadata is made. This way the loss of data chunks is avoided and the integrity of the client side data historian (125) is maintained.

In accordance with the invention, a method for deduplicating, at the client device (100), the data chunks of the electronic data files to be transferred, using the expansion cartridge (200) is also disclosed herein (300). As per this method embodiment, firstly, the method triggers the step of determining a Unique Identification String for the electronic data file to be transferred (310). Thereafter, the method triggers the step of generating a preliminary set of metadata for the electronic data file to be transferred (320). As per a preferred embodiment, the generating the preliminary set of metadata for the electronic data file to be transferred, consists of generating "SRC", that is, the MAC/Network address of the client device (100) where the electronic data file to be transferred is present (321), generating "DSTN", that is, the MAC/Network address of the client device (100) where the electronic data file to be transferred is to be received (322), generating "UID", that is, the Unique Identification String for the electronic data file to be transferred (323), generating "FNAME", that is, the name of the electronic data file to be transferred (324), generating "FSIZE", that is, the size of the electronic data file to be transferred (325), and generating "FFORMAT", that is, the format of the electronic data file to be transferred (326).

After generating the preliminary set of metadata for the electronic data file to be transferred (320), the method triggers the step of dividing the electronic data file to be transferred for generating data chunks (330). In accordance with the invention, the step of dividing the electronic data file to be transferred for generating data chunks (330), triggers during its execution, the sub-steps of recording the number at which each data chunk is generated for the electronic data file to be transferred, and, the total number data chunks generated from the electronic data file to be transferred and attributing them as the "CNO" and the "TNO" of that data chunk, respectively (333), recording the size of each data chunk generated for the electronic data file to be transferred and attributing the size as the "CSIZE" of that data chunk (336), and naming each data chunks generated thereof as per at least one nomenclature rule and attributing that string as the "CNAME" of the data chunk named thereof (339). Person skilled in the art would appreciate that all of the forgoing sub-steps would be repeated until the electronic data file to be transferred is divided, completely, and all data chunks are generated thereof.

After dividing the electronic data file to generate data chunks (330), the method triggers the next step of generating a final set of metadata for each data chunk generated thereof (340), which in accordance with the invention is achieved by, integrating the preliminary sets of metadata generated thereof, for the electronic data file to be transferred, with the "CNO", the "CSIZE", the "TNO" and the "CNAME" of each data chunk generated from the electronic data file to be transferred.

After generating the final set of metadata for each data chunk generated for the electronic data file to be transferred (340), the method triggers the step of comparing the data chunks with the final sets of metadata generated thereof with the data chunks with final sets of metadata already stored at the one or more discrete tuples in the client side data historian (125), and, discarding or storing the data chunks with the final sets of metadata generated thereof, based on the comparing thereof (350). In accordance with the invention, this step is achieved by further triggering numerous sub-steps, the first one being comparing the values of the "SRC", "DSTN" and "UID" from the final set of metadata of any one of the data chunks with the final set of metadata generated thereof, with the values of the "SRC", "DSTN" and "UID" of any one of the data chunks with the final set of metadata already stored at the one or more discrete tuples in the client side data historian (125), (353).

Upon comparing (353) if a match is not found between the values of the "SRC", "DSTN" and "UID" from the final set of metadata of any one of the data chunks generated thereof, and the values of the "SRC", "DSTN" and "UID" from the final sets of metadata of any of the data chunks stored at the one or more discrete tuples in the client side data historian (125), the sub-step (353) triggers storing the data chunks with the final sets of metadata received thereof at an unoccupied discrete tuple in the client side data historian (125), (354). If however, upon comparing (353), a match is found between the values of the "SRC", "DSTN" and "UID" from the final set of metadata of any one of the data chunks generated thereof, and the values of the "SRC", "DSTN" and "UID" from the final sets of metadata of any of the data chunks stored at a specific discrete tuple in the client side data historian (125), the sub-step (353) triggers reiterative comparing of the "TNO" and the "CSIZE" from the final sets of metadata of each data chunks generated thereof, with the "TNO" and the "CSIZE" from the final sets of metadata of each data chunk stored at the specific discrete tuple in the client side data historian (125), (356).

Upon comparison of the "TNO" and the "CSIZE" from the final sets of metadata of each data chunks generated thereof, with the "TNO" and the "CSIZE" from the final sets of metadata of each data chunk stored at the specific discrete tuple in the client side data historian (125), (356), if a match is found then the data chunks with the final sets of metadata received thereof are discarded (357), and if a match is not found then the data chunks with the final sets of metadata received thereof are stored at an unoccupied discrete tuple in the client side data historian (125), (358).

Upon execution of the steps disclosed above, in connection with the method (300), the deduplicating of the data chunks of the electronic data files to be transferred, at the client device (100) shall successfully be accomplished. However, in accordance with the invention, the method (300) is not just intended for deduplicating the client side data historian (125) while storing the data chunks with final sets of metadata therein, but also maintaining the deduplicacy of the client side data historian (125) when the data chunks with final sets of metadata are requested therefrom by other client devices (100) in the networked environment. It may be the case that upon receiving the request for a particular electronic data file to be transferred, the data chunks with the final sets of metadata are removed and transferred from the client side data historian (125) to the other client devices (100) requesting thereof, in which case all the data chunks for the particular electronic data file would get lost from the client side data historian (125) for future use and reference. Thus, in accordance with the invention, the method (300) disclosed herein, may as per a preferred embodiment, upon receiving a request from other client devices (100) in the networked environment, for transferring a particular electronic data file thereat, may comprise the additional steps of connecting with the client side data historian (125), and determining the discrete tuple therein where the data chunks with the final sets of metadata corresponding to the electronic data file requested thereof are stored, and thereafter, instead of transferring the data chunks with final sets of metadata stored therein, creating a copy of the data chunks with the final sets of metadata stored at the discrete tuple determined thereof and transmitting the copy created thereof to the other client devices (100) in the networked environment wherefrom the request of the data chunks with final sets of metadata is made. This way the loss of data chunks is avoided and the integrity of the client side data historian (125) is maintained.

While the present invention has been particularly shown and described with reference to exemplary embodiments thereof, it will be understood by those of ordinary skill in the art that various changes in form and details may be made therein without departing from the spirit and scope of the present invention as defined by the following claims.

We claim:

1. An expansion cartridge (200) attachable, externally, to a client device (100) carrying electronic data files to be transferred, wherein the expansion cartridge (200) is characterized by—
 a file management component (220) configured to generate a preliminary set of metadata for an electronic data file to be transferred,
 a chunk management component (240) configured to divide the electronic data file to be transferred to generate data chunks and generate a final set of metadata for each data chunk generated thereof,
 a storage component (260) configured to compare the data chunks with the final sets of metadata received thereof with the data chunks with final sets of metadata already stored at one or more discrete tuples in a client side data historian (125) in the client device (100), and discard or store the data chunks with the final sets of metadata generated thereof, based on the comparing thereof, and
 a mirroring component (280); and
 wherein, the expansion cartridge (200) on being attached with the client device (100) interfaces with the client side data historian (125) and a client side processor (150) in the client device (100) using interfacing options, including without limitation, Small Computer System Interfaces (SCSI), Fibre Channel (FC) Interface, Ethernet Interface, Advanced Technology Attachment (ATA) Interface or a combination thereof, wherein the file management component (220)—
 determines, a Unique Identification String for the electronic data file to be transferred; and
 generates, the preliminary set of metadata for the electronic data file to be transferred to consist of—
  "SRC", that is, a MAC/Network address of the client device (100) where the electronic data file to be transferred is present,
  "DSTN", that is, the MAC/Network address of the client device (100) requesting receipt of the electronic data file to be transferred, "UID", that is, the Unique Identification String for the electronic data file to be transferred, "FNAME", that is, a name of the electronic data file to be transferred, "FSIZE", that is, a size of the electronic data file to be transferred, and "FFORMAT", that is, a format of the electronic data file to be transferred.

2. The expansion cartridge (200) as claimed in claim 1 wherein the chunk management component (240) while dividing the electronic data file to be transferred to generate the data chunks, further triggers, in conjunction, sub-operations of— recording a number at which each data chunk is generated for the electronic data file to be transferred, and a total number of data chunks generated from the electronic data file to be transferred, and attributing the numbers recorded thereof as a "CNO" and a "TNO", respectively, of that data chunk;

recording a size of each data chunk generated for the electronic data file to be transferred, and attributing the size recorded thereof as a "CSIZE" of that data chunk; and assigning a name to each data chunk generated thereof as per at least one nomenclature rule, and attributing the name as a "CNAME" of that data chunk; and wherein all the sub-operations are repeated until the electronic data file to be transferred is completely divided and all data chunks are generated thereof.

3. The expansion cartridge (200) as claimed in claim 2 wherein the chunk management component (240) generates the final set of metadata for each data chunk generated thereof by integrating the preliminary set of metadata, generated for the electronic data file to be transferred, at the file management component (220), with the "CNO", the "TNO", the "CSIZE" and the "CNAME", for each data chunks generated for the electronic data file to be transferred, at the chunk management component (240).

4. The expansion cartridge (200) in claim 2 wherein the storage component (260)— receives the data chunks with the final sets of metadata for the electronic data file to be transferred, from the chunk management component (240); and compares the data chunks with the final sets of metadata received thereof with the data chunks with final sets of metadata already stored at one or more discrete tuples in the client side data historian (125), by— comparing the values of the "SRC", "DSTN" and "UID" from the final set of metadata of any one of the data chunks with the final set of metadata generated thereof, with the values of the "SRC", "DSTN" and "UID" of any one of the data chunks with the final set of metadata already stored at the one or more discrete tuples in the client side data historian (125), storing the data chunks with the final sets of metadata received thereof at an unoccupied discrete tuple in the client side data historian (125), if a match is not found between the values of the "SRC", "DSTN" and "UID" from the final set of metadata of any one of the data chunks generated thereof, and the values of the "SRC", "DSTN" and "UID" from the final sets of metadata of any of the data chunks stored at the one or more discrete tuples in the client side data historian (125), upon comparing, reiteratively comparing the "TNO" and the "CSIZE" from the final sets of metadata of each data chunk generated thereof, with the "TNO" and the "C SIZE" from the final sets of metadata of each data chunk stored at that discrete tuple in the client side data historian (125) where a match is found between the values of the "SRC", "DSTN" and "UID" from the final set of metadata of any one of the data chunks generated thereof, and the values of the "SRC", "DSTN" and "UID" from the final sets of metadata of any of the data chunks stored at the one or more discrete tuples in the client side data historian (125), upon comparing, wherein on reiteratively comparing— if a match is found between the "TNO" and the "CSIZE" in the final sets of metadata of each data chunk generated thereof, with the "TNO" and the "CSIZE" in the final sets of metadata of each data chunk stored at the discrete tuple, then the data chunks with the final sets of metadata received thereof are discarded, and if a match is not found between the "TNO" and the "CSIZE" in the final sets of metadata of each data chunk generated thereof, with the "TNO" and the "CSIZE" in the final sets of metadata of each data chunk stored at the discrete tuple, then the data chunks with the final sets of metadata received thereof are stored at the unoccupied discrete tuple in the client side data historian (125).

5. An expansion cartridge (200) attachable, externally, to a client device (100) carrying electronic data files to be transferred, wherein the expansion cartridge (200) is characterized by— a file management component (220) configured to generate a preliminary set of metadata for an electronic data file to be transferred, a chunk management component (240) configured to divide the electronic data file to be transferred to generate data chunks and generate a final set of metadata for each data chunk generated thereof, a storage component (260) configured to compare the data chunks with the final sets of metadata received thereof with the data chunks with final sets of metadata already stored at one or more discrete tuples in a client side data historian (125) in the client device (100), and discard or store the data chunks with the final sets of metadata generated thereof, based on the comparing thereof, and a mirroring component (280); and wherein, the expansion cartridge (200) on being attached with the client device (100) interfaces with the client side data historian (125) and a client side processor (150) in the client device (100) using interfacing options, including without limitation, Small Computer System Interfaces (SCSI), Fibre Channel (FC) Interface, Ethernet Interface, Advanced Technology Attachment (ATA) Interface or a combination thereof, wherein the mirroring component (280) receives a request from a second client device in a networked environment to transfer the electronic data file to be transferred, and thereafter— connects with the client side data historian (125), and determines a discrete tuple therein where the data chunks with final sets of metadata corresponding to the electronic data file requested thereof, are stored;

creates a copy of the data chunks with the final sets of metadata stored at the discrete tuple determined thereof; and transmits the copy created thereof to the second client device in the networked environment wherefrom the request of the data chunks with final sets of metadata is made.

6. A method for deduplicating, at a client device (100), data chunks of electronic data files to be transferred, using an expansion cartridge (200), (300) wherein the method (300) comprises the steps of—
  determining a Unique Identification String for an electronic data file to be transferred (310);
  generating a preliminary set of metadata for the electronic data file to be transferred (320);
  dividing the electronic data file to be transferred for generating data chunks (330);
  generating a final set of metadata for each data chunk generated thereof (340); and
  comparing the data chunks with the final sets of metadata generated thereof with the data chunks with final sets of metadata already stored at one or more discrete tuples in a client side data historian (125), and, discarding or storing the data chunks with the final sets of metadata generated thereof, based on the comparing thereof,
  wherein generating the preliminary set of metadata for the electronic data file to be transferred (320), consists of—
  generating "SRC", that is, a MAC/Network address of the client device (100) where the electronic data file to be transferred is present (321);
  generating "DSTN", that is, a MAC/Network address of a client device (100) requesting receiving of the electronic data file to be transferred (322);
  generating "UID", that is, the Unique Identification String for the electronic data file to be transferred (323);
  generating "FNAME", that is, a name of the electronic data file to be transferred (324);
  generating "FSIZE", that is, a size of the electronic data file to be transferred (325); and
  generating "FFORMAT", that is, a format of the electronic data file to be transferred (326).

7. The method (300) as claimed in claim 6 wherein the dividing the electronic data file to be transferred for generating the data chunks, triggers during its execution, substeps of—
  recording a number at which each data chunk is generated for the electronic data file to be transferred, and a total number of data chunks generated from the electronic data file to be transferred, and, attributing the numbers recorded thereof as a "CNO" and a "TNO", respectively, of that data chunk (333);
  recording a size of each data chunk generated for the electronic data file to be transferred, and attributing the size as a "CSIZE" of that data chunk (336); and
  assigning a name to each data chunk generated thereof as per at least one nomenclature rule, and attributing the name as a "CNAME" of that data chunk (339); and
  wherein all the sub-steps (333, 336, 339) are repeated until the electronic data file to be transferred is divided, completely, and all data chunks are generated thereof.

8. The method as claimed in claim 7 wherein generating the final set of metadata for each data chunk generated thereof (340) is achieved by integrating the preliminary sets of metadata generated thereof, for the electronic data file to be transferred, with the "CNO", the "TNO", the "C SIZE" and the "CNAME", of each data chunk generated from the electronic data file to be transferred.

9. The method (300) as claimed in claim 7 wherein the comparing the data chunks with the final sets of metadata generated thereof with the data chunks with final sets of metadata already stored at the one or more discrete tuples in the client side data historian (125), and, discarding or storing the data chunks with the final sets of metadata generated thereof based on the comparing thereof (350), comprises—
  comparing the values of the "SRC", "DSTN" and "UID" from the final set of metadata of any one of the data chunks with the final set of metadata generated thereof, with the values of the "SRC", "DSTN" and "UID" of any one of the data chunks with the final set of metadata already stored at the one or more discrete tuples in the client side data historian (125), (353);
  storing the data chunks with the final sets of metadata received thereof at an unoccupied discrete tuple in the client side data historian (125), if a match is not found between the values of the "SRC", "DSTN" and "UID" from the final set of metadata of any one of the data chunks generated thereof, and the values of the "SRC", "DSTN" and "UID" from the final sets of metadata of any of the data chunks stored at the one or more discrete tuples in the client side data historian (125), upon comparing (353), (354); and
  reiteratively comparing the "TNO" and the "CSIZE" from the final sets of metadata of each data chunk generated thereof, with the "TNO" and the "CSIZE" from the final sets of metadata of each data chunk stored at that discrete tuple in the client side data historian (125) where a match is found between the values of the "SRC", "DSTN" and "UID" from the final set of metadata of any one of the data chunks generated thereof, and the values of the "SRC", "DSTN" and "UID" from the final sets of metadata of any of the data chunks stored at the one or more discrete tuples in the client side data historian (125), upon comparing (353), (356), wherein on reiteratively comparing (356)—
  if a match is found between the "TNO" and the "CSIZE" in the final sets of metadata of each data chunk generated thereof, with the "TNO" and the "C SIZE" in the final sets of metadata of each data chunk stored at the discrete tuple, then the data chunks with the final sets of metadata received thereof are discarded (357), and
  if a match is not found between the "TNO" and the "CSIZE" in the final sets of metadata of each data chunk generated thereof, with the "TNO" and the "CSIZE" in the final sets of metadata of each data chunk stored at the discrete tuple, then the data chunks with the final sets of metadata received thereof are stored at the unoccupied discrete tuple in the client side data historian (125), (358).

10. A method for deduplicating, at a client device (100), data chunks of electronic data files to be transferred, using an expansion cartridge (200), (300) wherein the method (300) comprises the steps of—
  determining a Unique Identification String for an electronic data file to be transferred (310);
  generating a preliminary set of metadata for the electronic data file to be transferred (320);
  dividing the electronic data file to be transferred for generating data chunks (330);
  generating a final set of metadata for each data chunk generated thereof (340); and
  comparing the data chunks with the final sets of metadata generated thereof with the data chunks with final sets of metadata already stored at one or more discrete tuples in a client side data historian (125), and, discarding or storing the data chunks with the final sets of metadata generated thereof, based on the comparing thereof (350), wherein after the comparing the data chunks with the final sets of metadata generated thereof with the data chunks with final sets of metadata already stored at the one or more discrete tuples in the client side data historian (125), and, discarding or storing the data chunks with the final sets of metadata generated thereof based on the comparing thereof (350), the method (300) may upon receiving a request from a second client devices in a networked environment to transfer the electronic data file to be transferred, may trigger additional sub-steps of— connecting with the client side data historian (125), and determining the discrete tuple therein where the data chunks with the final sets of metadata corresponding to the electronic data file requested thereof, are stored;

creating a copy of the data chunks with the final sets of metadata stored at the discrete tuple determined thereof; and transmitting the copy created thereof to the second client device in the networked environment wherefrom the request of the data chunks with final sets of metadata is made.

\* \* \* \* \*